(12) United States Patent
Imre

(10) Patent No.: US 9,214,704 B2
(45) Date of Patent: Dec. 15, 2015

(54) THERMAL DECOUPLING OF BATTERY CELLS IN THE CASE OF A MALFUNCTION

(75) Inventor: Arpad Imre, Vaihingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 13/807,791

(22) PCT Filed: Jul. 4, 2011

(86) PCT No.: PCT/EP2011/061225
§ 371 (c)(1),
(2), (4) Date: Mar. 11, 2013

(87) PCT Pub. No.: WO2012/001174
PCT Pub. Date: Jan. 5, 2012

(65) Prior Publication Data
US 2013/0189551 A1    Jul. 25, 2013

(30) Foreign Application Priority Data
Jul. 2, 2010    (DE) .......................... 10 2010 030 881

(51) Int. Cl.
| H01M 2/34 | (2006.01) |
| H01M 10/48 | (2006.01) |
| H01M 10/63 | (2014.01) |
| H01M 2/10 | (2006.01) |
| H01M 10/625 | (2014.01) |
| H01M 10/653 | (2014.01) |
| H01M 10/617 | (2014.01) |

(Continued)

(52) U.S. Cl.
CPC .......... *H01M 10/502* (2013.01); *H01M 2/1077* (2013.01); *H01M 2/1094* (2013.01); *H01M 2/34* (2013.01); *H01M 2/348* (2013.01); *H01M 10/613* (2015.04); *H01M 10/617* (2015.04); *H01M 10/625* (2015.04); *H01M 10/63* (2015.04); *H01M 10/653* (2015.04); *H01M 10/658* (2015.04)

(58) Field of Classification Search
CPC ... H01M 10/5004; H01M 2/34; H01M 2/348; H01M 10/486; H01M 10/482
See application file for complete search history.

(56) References Cited

U.S. PATENT DOCUMENTS

| 5,456,994 A | 10/1995 | Mita |
| 2006/0164795 A1 | 7/2006 | Jones et al. |
| 2011/0159339 A1 | 6/2011 | Gregor et al. |

FOREIGN PATENT DOCUMENTS

| CN | 1241305 | 1/2000 |
| CN | 101627500 | 1/2010 |
| DE | 10 2007 010 | 8/2008 |

(Continued)

OTHER PUBLICATIONS

International Search Report, International Application No. PCT/EP2011/061225, dated Dec. 9, 2011.

*Primary Examiner* — Ula C Ruddock
*Assistant Examiner* — Thomas Parsons
(74) *Attorney, Agent, or Firm* — Kenyon & Kenyon LLP

(57) ABSTRACT

A battery module having a plurality of battery cells positioned adjacent to one another and electrically connected to one another, between which the thermal resistance between adjacent battery cells may be increased in the case of a malfunction of the battery module and/or of individual battery cells, in order to prevent overheating of adjacent cells. In addition, a method for thermally decoupling battery cells in the case of a malfunction is described.

11 Claims, 2 Drawing Sheets

(51) Int. Cl.
*H01M 10/613* (2014.01)
*H01M 10/658* (2014.01)

(56) References Cited

FOREIGN PATENT DOCUMENTS

| | | |
|---|---|---|
| DE | 10 2009 018 | 10/2010 |
| EP | 0 964 470 | 12/1999 |
| EP | 2 216 843 | 8/2010 |
| JP | 2008-181822 | 8/2008 |
| JP | 2009-4362 | 1/2009 |
| JP | 2010-61982 | 3/2010 |
| JP | 2010-97693 | 4/2010 |
| KR | 2006 0086120 | 7/2006 |
| WO | WO 2008/027343 | 3/2008 |
| WO | WO2011123808 | * 10/2011 |

* cited by examiner

THERMAL DECOUPLING OF BATTERY CELLS IN THE CASE OF A MALFUNCTION

FIELD

The present invention relates to a battery module having a plurality of battery cells situated adjacent to one another and electrically connected to one another, between which the thermal resistance between adjacent battery cells may be increased in the case of a malfunction of the battery module and/or of individual battery cells, in order to prevent overheating of adjacent cells. In addition, the present invention relates to a method for thermally decoupling battery cells in the case of a malfunction.

BACKGROUND INFORMATION

In the future, the energy stores for vehicles and for applications in the power industry, such as, e.g., stationary energy stores, will have to have a substantially greater storage potential and a higher reliability, a substantially longer service life and, above all, a substantially higher level of safety. Li-ion/lithium metal technology has clear performance and weight advantages over other energy stores, but today, it does not yet have the necessary margin of safety.

For use, e.g., in vehicles, the safety of lithium ion batteries is a factor that is not to be neglected. In comparison with applications in mobile electronics, the chemically active mass of a traction battery is substantially higher, and therefore, the potential risk is markedly greater. Since the electrodes are protected against only a sudden reaction with the highly flammable, organic electrolytes by a passivating surface film, an operating state that promotes sudden break-up of the films, such as high temperatures, overcharging or excessive discharging, is to be prevented. Thermal breakdown of the cell from local overheating may also be initiated by internal short circuits, e.g., due to contamination during production.

In general, the safety is substantially a function of the combination of the materials actually selected for electrodes and electrolyte, as well as of the quality of the manufacturing of the cells. The traction batteries are typically made up of several hundred to several thousand individual cells, in order to provide the required range (battery capacity) and power. In practical application, the individual cells are assembled to form a spatially compact module. Normally, the cells in a module are so tightly packed that in the case of thermal breakdown of a single cell, adjacent cells may also be "ignited." In this context, there is a risk of decomposition or destruction of the entire battery module via a chain reaction. In an extreme case, the battery module may also burn, in which case, in particular, it must be taken into account that many types of battery modules, such as lithium ion storage batteries, may not come into contact with water, in order to prevent the typical alkali metal reaction with water to form hydrogen. In this respect, anhydrous extinguishing agents must be used in the case of fire.

The Korean Patent Application KR 2006086120 describes a battery module, whose battery cells dissipate heat in a more effective manner due to modified positioning of the battery cells, and which provides cooling channels at the battery cells.

U.S. Pat. No. 5,456,994 A describes a battery module having temperature monitoring and a closed housing for use in electric vehicles. The battery modules described have a housing provided with an air inlet on the front side and an air outlet on the back side. Using partitions, the housing is divided into individual chambers, into which individual battery cells may be inserted.

International Patent Application WO 2008027343 describes a battery module for vehicles, in which battery cells are arranged in groups set apart from one another. Several battery cells are arranged inside of a housing, in two groups, which are separated from one another by a central region. The housing is configured to allow cooling air from the central region to reach the cells. In this context, each group of cells is arranged in two layers set apart relative to one another.

In conventional battery modules, due to the proximity of the individual battery cells with respect to one another, there is a risk that in the event of a thermal overload of an individual cell, adjacent cells will be detrimentally affected and thermally overloaded as well. In the extreme case, a breakdown of a cell may cause, in this case, the breakdown of further cells in a chain reaction. On the other hand, an energy density of the battery modules, which is as high as possible, is desired, which is why as many battery cells as possible must be spaced closely to one another.

SUMMARY

An object of the present invention is to provide a battery module and a method, in and by which a thermal breakdown of adjacent battery cells is prevented.

In accordance with the present invention, an example battery module, which includes a plurality of battery cells positioned adjacent to one another and electrically connected to each other, as well as an example device for monitoring at least one operating parameter of the battery cells and/or of the battery module, is provided, which is characterized in that the battery module has a device for increasing the thermal resistance between adjacent battery cells; the device being connected to the device for monitoring the at least one operating parameter of the battery cells and/or of the battery module in such a manner, that when a threshold value of the monitored operating parameter of individual cells and/or of the battery module is exceeded, the device for increasing the thermal resistance is triggered.

Therefore, in a normal operating state, the packing of electrically coupled battery cells in a battery module of the present invention may be as dense as possible, which means that an energy density may be attained that is as high as possible in relation to the required space of the battery module. In addition, the battery cells in the battery module may also be thermally coupled in this manner, which, in the case of substantially identical battery cells in a battery module, results in a power output of the battery cells that is as uniform as possible.

In the case of a malfunction or an overload of a battery cell, which may result in a breakdown of the battery cell, the present invention provides that the thermal resistance between adjacent battery cells be increased. By this means, the heat transfer from a malfunctioning or overloaded battery cell to adjacent battery cells may be prevented, and in particular, damage to adjacent battery cells may be prevented. In particular, the burning-out of an entire battery module due to a thermal chain reaction of cells adjacent to one another may be prevented.

According to an example embodiment of the present invention, operating parameters may include the voltage, the current intensity, the charging current, the temperature or other parameters, which allow an inference to be made regarding the functioning and/or the operating state of a battery cell or the battery module. Preferably, at least the temperature of the individual battery cells, of a group of battery cells, and/or of the entire battery module is monitored. In a further preferred embodiment of the present invention, at least two operating parameters of the individual battery cells, of a group of battery cells and/or of the entire battery module are monitored and taken into account as a threshold value for triggering the increase in the thermal resistance between the adjacent battery cells.

In one preferred embodiment of the present invention, it includes a device, which is for breaking the electrical connection between the individual battery cells and is connected to the device for monitoring the at least one operating parameter, in such a manner, that when the threshold value of the monitored operating parameter is exceeded, the battery cells are electrically disconnected from one another.

Such a device for electrical disconnection may be formed, for example, by cut-off relays, diodes or the like. In one embodiment of the present invention, the battery cells may also be electrically disconnected by rupture joints in the electrical connections, which are severed as a result of the increase in the distance between the battery cells, and thus, produce electrical disconnection. Such rupture joints may be implemented, for example, in the form of plug-and-socket connections. By this means, electrical short circuits in the battery module in response to exceeding a critical operating state may be prevented.

In one preferred specific embodiment of the present invention, the thermal resistance between adjacent battery cells is increased by increasing the distance of the adjacent cells from one another, as soon as a threshold value of the monitored operating parameter is exceeded by an individual cell and/or the entire battery module.

In one preferred embodiment of the present invention, the device for increasing the thermal resistance between the adjacent battery cells is a device for mechanically increasing the distance between the individual cells, such as a spring element, which is loaded in a normal operating state of the battery module and is released when the threshold temperature value is exceeded; the spring element being positioned in the battery module in such a manner, that release of the spring element produces an increase in the distance between at least two adjacent battery cells. In this context, the distance may be increased in both the horizontal and vertical directions. Thus, it may be provided that the spring element press apart the battery cells positioned adjacent to one another, in order to increase the distance between the battery cells in this manner and thereby increase the thermal resistance between the cells. In the same manner, the present invention may provide that a spring element shift a battery cell orthogonally to the configuration direction of the battery cells in response to a threshold temperature value being exceeded, which means that the distance between the adjacent battery cells is likewise increased.

In a further embodiment of the present invention, the device for increasing the thermal resistance between the battery cells is a pyrotechnic device, which is triggered by the device for monitoring the at least one operating parameter in response to the threshold value of the monitored operating parameter being exceeded; the pyrotechnic reaction resulting in a mechanical increase in the distance between at least two adjacent battery cells. Such a pyrotechnic device may be implemented, for example, in the manner of an airbag, in which the gases released by a pyrotechnic reaction flow into a folded airbag, and thus, cause it to expand. The expanding airbag may then produce the desired increase in the thermal resistance in the manner of the above-described spring element.

In a further embodiment of the present invention, the device for increasing the thermal resistance between adjacent battery cells is formed by an apparatus, which, when triggered by the device for monitoring the at least one operating parameter, introduces an insulating foam into a space between two adjacent battery cells in response to the threshold value of the monitored operating parameter being exceeded.

In this context, for example, a foam having a polyurethane base, preferably, a noncombustible polyurethane, may be used as a suitable insulating foam. Foams, as are used, for example, as fireproof foam in cable bushings, are particularly suitable. In this context, the introduced insulating foam may fulfill the function of a fire wall between two adjacent battery cells.

The apparatus for introducing the insulating foam between adjacent battery cells may include, for example, a supply cartridge, which contains the two reactive components of a two-component foam, as well as corresponding equipment such as valves and lines, with the aid of which the reactive components are mixed and introduced as a reactive mixture into the space between two adjacent battery cells. Preferably, the two reactive components are mixed, both spatially and temporally, shortly before introducing them into the space between two battery cells.

According to an example embodiment of the present invention, the housing, which accommodates the battery cells necessary for forming a battery module, is preferably formed in such a manner, that, for the case in which the at least one monitored operating parameter exceeds a threshold value, the housing has sufficient space for increasing the distance between two adjacent battery cells. This may be accomplished in that the housing has an empty space, which may be used for increasing the spacing of two adjacent battery cells. In the same manner, it may be provided that the housing have rupture joints, which split in the case of a necessary increase in the thermal resistance and allow, in this manner, the distance between two adjacent battery cells to be increased. In addition, the present invention may provide for the housing to be constructed in the manner of an accordion, so that it is possible to pull apart or push apart the housing, for example, using a spring element as described above, or using a pyrotechnic device.

The present invention also provides an example method for thermally decoupling battery cells positioned adjacent to one another in a battery module; at least one operating parameter of the individual battery cells and/or of the battery module being monitored, and the thermal resistance between two cells positioned adjacent to one another being increased in response to a threshold value of the monitored operating parameter of a battery cell and/or of the battery module being exceeded.

In one preferred specific embodiment of the method of the present invention, the thermal resistance between two adjacent battery cells is increased by increasing the distance between the two adjacent battery cells. This may be accomplished, for example, by the above-described devices, using a spring element and/or a pyrotechnic device.

In one preferred embodiment of the method of the present invention, the individual battery cells are electrically disconnected, e.g., by a cut-off relay, prior to increasing the distance between two adjacent battery cells. By this means, electrical short circuits or arcs may be prevented while the distance between the battery cells is increased.

In a further embodiment of the method of the present invention, an insulating foam is introduced into a space between two adjacent battery cells, in order to increase the thermal resistance.

In this connection, a noncombustible reactive foam made up of at least two reactive components is preferably introduced from a supply cartridge into the space between two adjacent battery cells, using suitable equipment.

Further specific embodiments of the present invention are found in the following examples, figures, and descriptions of figures.

DETAILED DESCRIPTION OF EXAMPLE EMBODIMENTS

Figure 1:
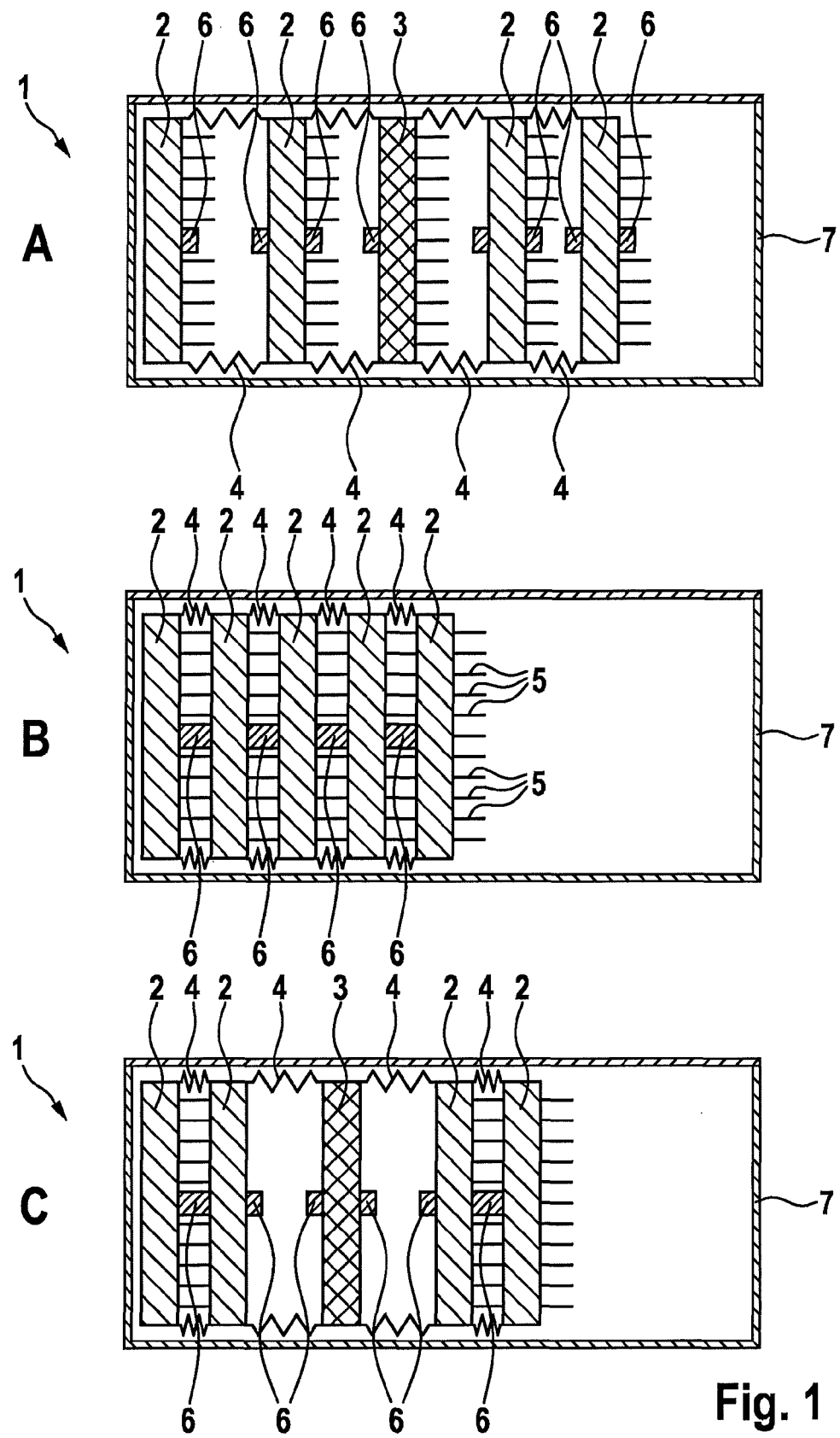
FIG. 1 shows schematically, the method of functioning of a battery module according to an example embodiment of the present invention.

FIG. 1 schematically shows the method of functioning of a battery module 1 according to an example embodiment of the present invention. Illustration B shows the normal operating state of battery module 1, in which the battery cells 2, 3 situated in a battery housing 7 are positioned closely to one another. Spring elements 4, which are in a loaded condition in the normal operating state of the battery module, are positioned between battery cells 2, 3. Battery modules 2, 3 are held together by closed retaining clips 6, in opposition to the force acting through the spring elements. Closed retaining clips 6 are equipped with a thermocouple, which opens them when a threshold temperature value is exceeded. The ribs denoted by reference numeral 5 are used as cooling fins of battery cells 2, 3, and in the illustrated, normal operating state of battery module 1, they form cooling channels through which cooling air may flow. Illustration A shows a battery module 1 according to the present invention, in which all of the retaining clips have been released in response to a threshold temperature value being exceeded due to overheating of battery cell 3, and the battery cells 2, 3 positioned in battery housing 7 have been pressed apart by the spring force of spring elements 4, in order to increase the thermal resistance between battery cells 2, 3. In illustration C, the overheating of battery cell 3 has only caused the retaining clips engaging with battery cell 3 to be released, which means that overheated battery cell 3 was spatially separated from the battery cells 2 still arranged, in each instance, in pairs.

Figure 2:
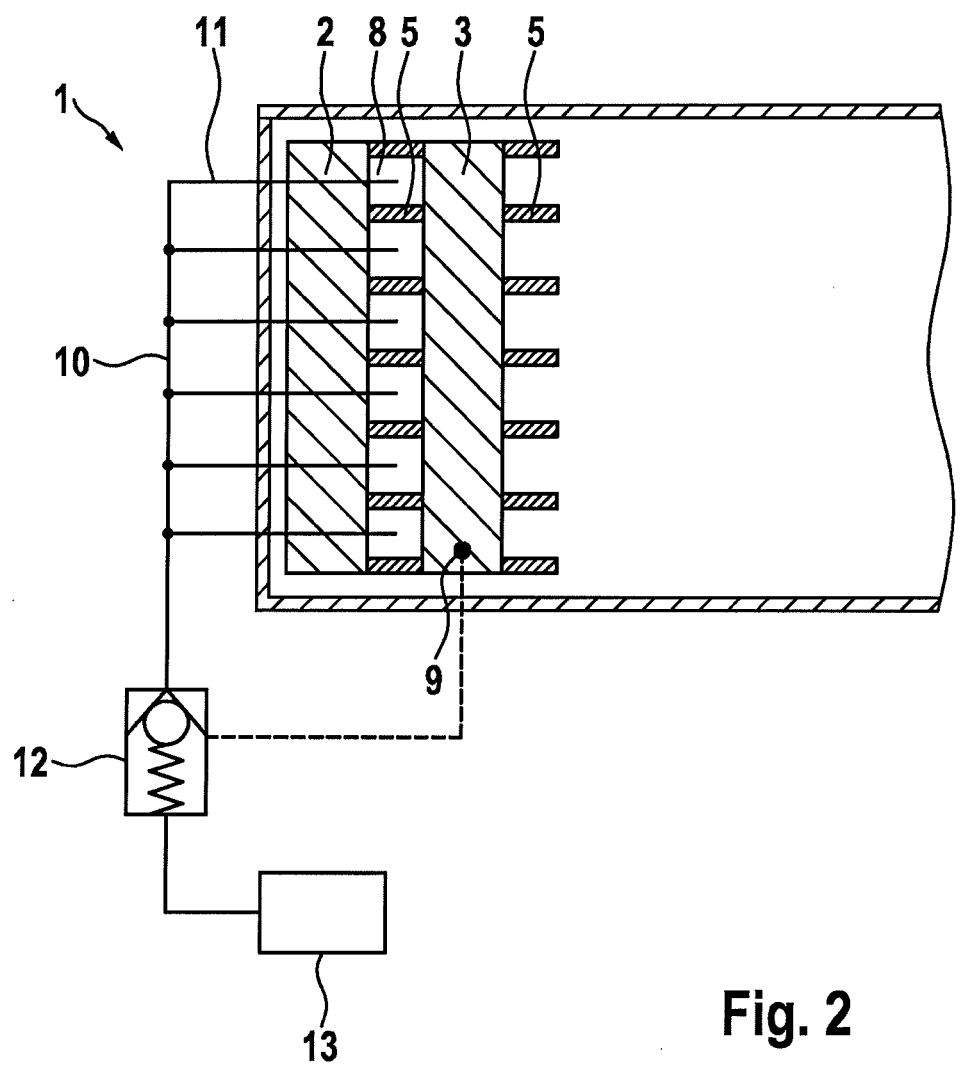
FIG. 2 shows schematically, the method of functioning of a battery module of the example embodiment of the present invention, using an insulating foam.

FIG. 2 shows an example embodiment of a battery module 1 according to the present invention, in which in the event of a malfunction, the thermal resistance between two battery cells 2, 3 positioned adjacent to one another is increased by an insulating foam. In response to a threshold temperature value being exceeded, a thermoelectric sensor 9 opens a valve 12, via which a noncombustible, 2-component polyurethane foam from a supply cartridge 13 flows through a manifold 10 and distribution conduits 11 into the cooling channels 8 formed by cooling fins 5, and there, it spontaneously cures to form a thermal insulating layer.

What is claimed is:

1. A battery module, comprising:
a plurality of battery cells positioned adjacent to one another and electrically connected to one another;
a device configured to monitor at least one operating parameter of at least one of: the battery cells and the battery module; and
a device configured to increase thermal resistance between adjacent battery cells, the device configured to increase the thermal resistance being connected to the device to monitor in such a manner that the device configured to increase the thermal resistance is triggered in response to a threshold value of the monitored operating parameter being exceeded.

2. The battery module as recited in claim 1, further comprising:
a device to break the electrical connection between the individual battery cells, the device to break the electrical connection between the battery cells being connected to the device to monitor the at least one operating parameter in such a manner that the battery cells are disconnected from one another in response to the threshold temperature value being exceeded.

3. The battery module as recited in claim 1, wherein the device to increase the thermal resistance between the battery cells is a device configured to mechanically increase a distance between the individual battery cells.

4. The battery module as recited in claim 3, wherein the device to increase the thermal resistance between the battery cells includes at least one spring element which is loaded in a normal operating state of the battery module and is released in response to the threshold value of the monitored operating parameter being exceeded, the spring element being positioned in the battery module in such a manner that a release of the spring element produces an increase in a distance between at least two adjacent ones of the battery cells.

5. The battery module as recited in claim 3, wherein the device to increase the thermal resistance between the battery cells is a pyrotechnic device, which is triggered by the device to monitor the at least one operating parameter in response to a threshold value of the monitored operating parameter being exceeded, and a pyrotechnic reaction of the pyrotechnic device results in a mechanical increase in a distance between at least two adjacent ones of the battery cells.

6. The battery module as recited in claim 3, wherein the device to increase the thermal resistance between adjacent battery cells includes an apparatus, which, when triggered by the device to monitor the at least one operating parameter, introduces an insulating foam into a space between two adjacent battery cells in response to the threshold value of the monitored operating parameter being exceeded.

7. The battery module as recited in claim 6, wherein the insulating foam is a noncombustible, polyurethane-based insulating foam.

8. The battery module as recited in claim 1, wherein the thermal resistance is increased by increasing a distance between two adjacent ones of the battery cells.

9. The battery module as recited in claim 1, wherein the battery cells are held together by closed retaining clips, in opposition to a force acting through spring elements, wherein the closed retaining clips are equipped with a thermocouple, which opens them when the threshold temperature value is exceeded.

10. A method for thermally decoupling battery cells positioned adjacent to one another in a battery module, comprising:
monitoring at least one operating parameter of at least one of: the battery cells and the battery module; and
increasing a thermal resistance between two of the battery cells positioned adjacent to one another in response to a threshold value of the monitored operating parameter of at least one of a battery cell and the battery module being exceeded.

11. The method as recited in claim 10, further comprising: introducing an insulating foam into a space between two adjacent ones of the battery cells to increase the thermal resistance.

\* \* \* \* \*